United States Patent
Kim et al.

(10) Patent No.: US 10,659,321 B2
(45) Date of Patent: May 19, 2020

(54) ELECTRONIC APPARATUS FOR RECORDING DEBUGGING INFORMATION AND CONTROL METHOD THEREOF

(71) Applicant: SAMSUNG ELECTRONICS CO., LTD., Suwon-si, Gyeonggi-do (KR)

(72) Inventors: Mun-seok Kim, Hwaseong-si (KR); Sang-mook Lim, Seoul (KR); Tomasz Duda, Zamlynie (PL)

(73) Assignee: Samsung Electronics Co., Ltd., Suwon-si, Gyonggi-do (KR)

( * ) Notice: Subject to any disclaimer, the term of this patent is extended or adjusted under 35 U.S.C. 154(b) by 205 days.

(21) Appl. No.: 15/687,825

(22) Filed: Aug. 28, 2017

(65) Prior Publication Data

US 2018/0123915 A1    May 3, 2018

(30) Foreign Application Priority Data

Oct. 31, 2016  (KR) .................. 10-2016-0143040

(51) Int. Cl.
*G06F 11/00* (2006.01)
*H04L 12/26* (2006.01)
(Continued)

(52) U.S. Cl.
CPC ........ *H04L 43/024* (2013.01); *G06F 11/3495* (2013.01); *G06F 11/3624* (2013.01);
(Continued)

(58) Field of Classification Search
CPC . H04L 43/024; H04L 41/0213; H04L 43/026; G06F 11/3495; G06F 11/3664
See application file for complete search history.

(56) References Cited

U.S. PATENT DOCUMENTS 7,149,636 B2 * 12/2006 Cyran ................. G06F 11/3024
702/60
7,434,205 B1 * 10/2008 Steenhagen ............... G06F 8/20
717/124
(Continued)

FOREIGN PATENT DOCUMENTS

CN          1393775       1/2003
CN        101826049       7/2012
(Continued)

OTHER PUBLICATIONS

Search Report and Written Opinion dated Dec. 15, 2017 in counterpart International Patent Application No. PCT/KR2017/009946.
(Continued)

*Primary Examiner* — Esaw T Abraham
(74) *Attorney, Agent, or Firm* — Nixon & Vanderhye P.C.

(57) ABSTRACT

A method and an electronic apparatus for converting debugging information to a binary form and providing more information in the same capacity memory are disclosed. A control method of the electronic apparatus which records debugging information, the method includes: obtaining debugging information using a source code; adding index information corresponding to the debugging information to the debugging information and storing the debugging information in a buffer; and converting a plurality of pieces of index information stored in the buffer to a binary file.

17 Claims, 9 Drawing Sheets

(51) Int. Cl.
*H04L 12/24* (2006.01)
*G06F 11/34* (2006.01)
*G06F 11/36* (2006.01)

(52) U.S. Cl.
CPC ...... *G06F 11/3664* (2013.01); *H04L 41/0213* (2013.01); *H04L 43/026* (2013.01); *H04L 43/028* (2013.01); *H04L 43/08* (2013.01); *G06F 2201/80* (2013.01); *H04L 41/0896* (2013.01); *H04L 43/106* (2013.01)

(56) References Cited

U.S. PATENT DOCUMENTS

| | | | | |
|---|---|---|---|---|
| 7,496,903 | B2* | 2/2009 | Rees | G06F 11/3612 717/124 |
| 7,739,664 | B2* | 6/2010 | Bates | G06F 11/3664 717/127 |
| 7,788,730 | B2* | 8/2010 | Dean | G06F 21/54 713/156 |
| 7,849,364 | B2* | 12/2010 | Callender | G06F 11/366 714/38.1 |
| 8,984,485 | B2 | 3/2015 | Elshishiny et al. | |
| 9,223,678 | B2* | 12/2015 | Moyer | G06F 11/36 |
| 9,384,106 | B2* | 7/2016 | Segger | G06F 11/26 |
| 9,807,230 | B2* | 10/2017 | Hu | H04M 3/22 |
| 10,073,767 | B2* | 9/2018 | Gadiya | G06F 11/3692 |
| 10,089,212 | B2* | 10/2018 | Iwai | G06F 11/3656 |
| 2003/0037257 | A1 | 2/2003 | Wang | |
| 2004/0098640 | A1 | 5/2004 | Smith | |
| 2007/0006174 | A1 | 1/2007 | Sohm et al. | |
| 2010/0251213 | A1 | 9/2010 | Yamin | |
| 2012/0144208 | A1 | 6/2012 | Kim et al. | |

FOREIGN PATENT DOCUMENTS

| | | |
|---|---|---|
| KR | 10-2004-0058643 | 7/2004 |
| KR | 10-0978372 | 8/2010 |
| KR | 10-0982775 | 9/2010 |
| KR | 10-2012-0061405 | 6/2012 |
| KR | 10-2013-0023423 | 3/2013 |
| KR | 10-2013-0047439 | 5/2013 |
| KR | 10-1304234 | 9/2013 |
| WO | 2008/061102 | 5/2008 |

OTHER PUBLICATIONS

Extended European Search Report dated Oct. 4, 2019 for EP Application No. 17865671.6.

\* cited by examiner

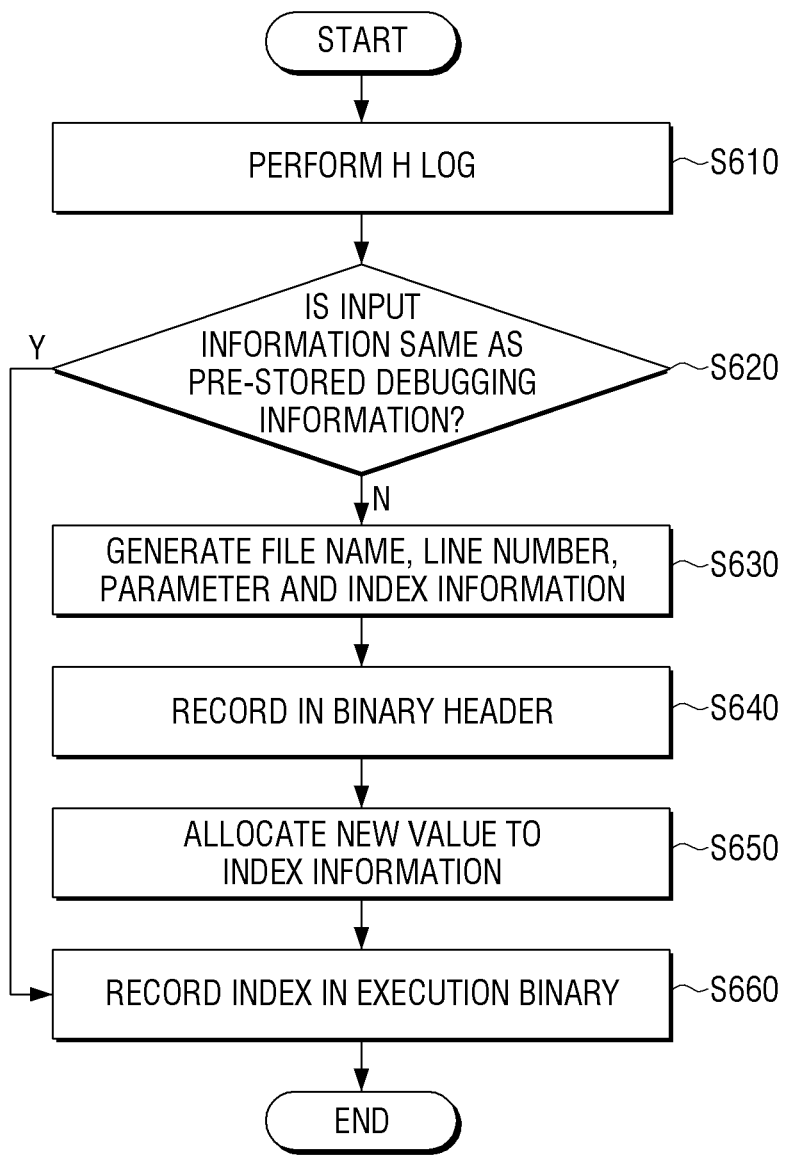

```
// A.ccp, 100th line
int value = 10000;
printf("ABCDEFGHIJKLMNOPQRS %d", value);
```

CARRYING OUT 100 TIMES

```
ABCDEFGHIJKLMNOPQRS 10000
ABCDEFGHIJKLMNOPQRS 10000
ABCDEFGHIJKLMNOPQRS 10000
. . .
```

```
// A.ccp, 100th line
int value = 10000;
hlog("ABCDEFGHIJKLMNOPQRS %d", value);
```

CARRYING OUT 100 TIMES

```
1A.cpp100 (index, file name, line number)
11111111 ...
```

ELECTRONIC APPARATUS FOR RECORDING DEBUGGING INFORMATION AND CONTROL METHOD THEREOF

CROSS-REFERENCE TO RELATED APPLICATION

This application is based on and claims priority under 35 U.S.C. § 119 to Korean Patent Application No. 10-2016-0143040, filed in the Korean Intellectual Property Office on Oct. 31, 2016, the disclosure of which is incorporated by reference herein in its entirety.

BACKGROUND

1. Field

The present disclosure relates generally to a debugging device for storing a debugging log message, and for example, to a method and an apparatus for obtaining index information regarding an executed process and recording a log by using thereof.

2. Description of Related Art

With the advancement of technology, the functions of electronic devices such as a digital TV and etc. have become complex and diverse. As manufacturers provide open application platforms, many companies are striving to participate in development and provide their own services. However, providing an open application platform has the problem that unpredictable operations may occur at an early development stage. In the method used in the existing development stage, obtaining the debugging information is limited and a lot of cost is required, and a new method of recording the debugging information is needed.

In the development stage of a digital receiver such as a digital TV, if a problem is reported, the problem is solved by reproducing the same problem and using real-time debugging information through a console.

However, if such a problem is not reproduced, or if the reproduction method is not accurate, problem solving is practically impossible. Most of the problems that occur in the market are not easy to reproduce because the external environment is different from the development stage. In order to identify the problems occurring in the market, even if the developers visit the place, it is impossible to obtain debugging information in real-time if it is a problem which occurs only at a certain time.

Therefore, if a problem occurred, all debugging information about the problem that had occurred had to be saved. However, in the existing log message method, since the size of a message that can be stored by the product is limited, it is practically impossible to store a log message for a meaningful period of time.

SUMMARY

Example embodiments are related to an electronic apparatus which stores debugging information using index information rather than storing a log message itself in the process of debugging and a control method thereof.

The present disclosure is provided to reduce or avoid cost increase because of an existing debugging method problem and to provide a new debugging method to always record debugging information when a problem is incurred.

According to an aspect of an example embodiment, a control method of an electronic apparatus which records debugging information is provided, the method includes: obtaining debugging information using a source code; adding index information corresponding to the debugging information to the debugging information and storing the debugging information in a buffer; and converting a plurality of pieces of index information stored in the buffer to a binary file.

The debugging information may include at least one of file information, line information and parameter information.

The debugging information may further include string information.

The index information may be identified using at least one of the file information, the line information and the parameter information.

The buffer may be a circular buffer.

In response to there being a user request for error checking, recovering the debugging information using at least one of the binary file and the source code may be further included.

The storing may further include: identifying whether the debugging information is pre-stored debugging information; and if the debugging information is not pre-stored debugging information, adding index information corresponding to the debugging information to the debugging information and storing the debugging information in the buffer.

In response to the debugging information being the same as the pre-stored debugging information, the index information of the pre-stored debugging information may be stored in the buffer.

According to an aspect of another example embodiment, an electronic apparatus which records debugging information is provided, the apparatus includes: a buffer configured to store debugging information; and a processor configured to obtain the debugging information using a source code, to add index information corresponding to the debugging information to the debugging information, and to convert a plurality of pieces of index information stored in the buffer to a binary file.

The debugging information may include at least one of file information, line information and parameter information.

The debugging information may further include string information.

The index information may be identified using at least one of the file information, the line information and the parameter information.

The buffer may be a circular buffer.

The processor, in response to there being a user request for error checking, may recover the debugging information using at least one of the binary file and the source code.

The processor may identify whether the debugging information is pre-stored debugging information, and if the debugging information is not pre-stored debugging information, add index information corresponding to the debugging information to the debugging information and store the debugging information in the buffer.

In response to the debugging information being the same as the pre-stored debugging information, the index information of the pre-stored debugging information may be stored in the buffer.

According to an aspect of yet another example embodiment, a computer readable recording medium including a program which when executed by a processor causes an electronic apparatus to perform a control method which records debugging information, the control method of the electronic apparatus including: obtaining debugging information using a source code; adding index information corresponding to the debugging information to the debugging information; storing the debugging information in a buffer; and converting a plurality of pieces of index information stored in the buffer to a binary file.

According to the various example embodiments, the same information is not repetitively stored by adding the index information to the debugging information and storing the debugging information in the buffer, and thus, a space in the buffer may be saved.

A method to store more information by effectively using a buffer when a log message is stored in a limited memory.

BRIEF DESCRIPTION OF THE DRAWINGS

The above and/or other aspects, features and attendant advantages of the present disclosure will be apparent and more readily appreciated from the following detailed description, taken in conjunction with the accompanying drawings, in which like reference numerals refer to like elements, and wherein:

FIG. 6 is a flowchart illustrating an example method in which a binary value is stored in a buffer when an h log function is performed according to an example embodiment;

DETAILED DESCRIPTION

The terms used in example embodiments will be briefly explained, and example embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the example embodiments to a specific form. Instead, modifications, equivalents and replacements included in the disclosed concept and technical scope of this specification may be employed. In describing the example embodiments, well-known functions or constructions may not be described in detail if they would obscure the specification with unnecessary detail.

The terms such as "first," "second," and so on may be used to describe a variety of elements, but the elements should not be limited by these terms. The terms are used to distinguish one component from another component.

As used herein, the singular forms are intended to include the plural forms as well, unless the context clearly indicates otherwise. The terms, "include," "comprise," "is configured to," etc. of the description are used to indicate that there are features, numbers, steps, operations, elements, parts or combination thereof, and they should not exclude the possibilities of combination or addition of one or more features, numbers, steps, operations, elements, parts or combination thereof.

The example embodiments of the disclosure will be described in greater detail below in a manner that will be understood by one of ordinary skill in the art. However, example embodiments may be realized in a variety of different configurations, and not limited to descriptions provided herein. Also, well-known functions or constructions may not be described in detail if they would obscure the disclosure with unnecessary detail.

Figure 1:
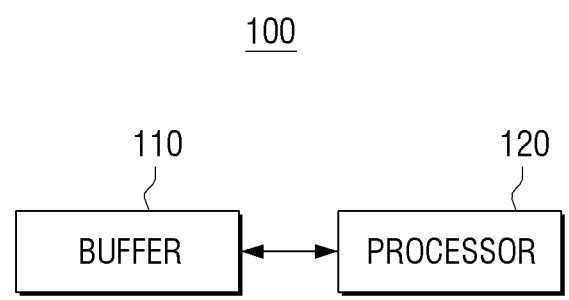
FIG. 1 is a block diagram illustrating an example electronic apparatus according to an example embodiment.

FIG. 1 is a block diagram illustrating an example electronic apparatus according to an example embodiment.

An electronic apparatus 100 may include a buffer 110 and a processor (e.g., including processing circuitry) 120. However, it is not limited such a structure, and various components may be further added.

The electronic apparatus 100 is a digital receiver such as a digital television (TV). The digital TV may record all kinds of source codes regarding a digital signal provided from an external. Hereinafter, a digital TV is described as an example embodiment. However, the present disclosure is not limited thereto, and it may be various electronic apparatuses which need debugging for resolving a problem.

Meanwhile, if an error occurs while the digital TV is operated, the error should be resolved by debugging. The debugging may refer, for example, to an act of fixing a bug. Specifically, if an error occurs while the digital TV is operated, debugging information to analyze this is needed. A debugging apparatus may reproduce the error using debugging information and resolve the error by analyzing the reproduced problem.

The debugging information is information that may be necessary for figuring out a problem of a source code in a program. Specifically, the debugging information may refer, for example, to information added to a source code so that a program execution may be stopped by designating a certain point (break point) of the source code and a developer may look at an operation of the program. In addition, a debugging code may refer, for example, to a code for outputting debugging information.

Figure 4:
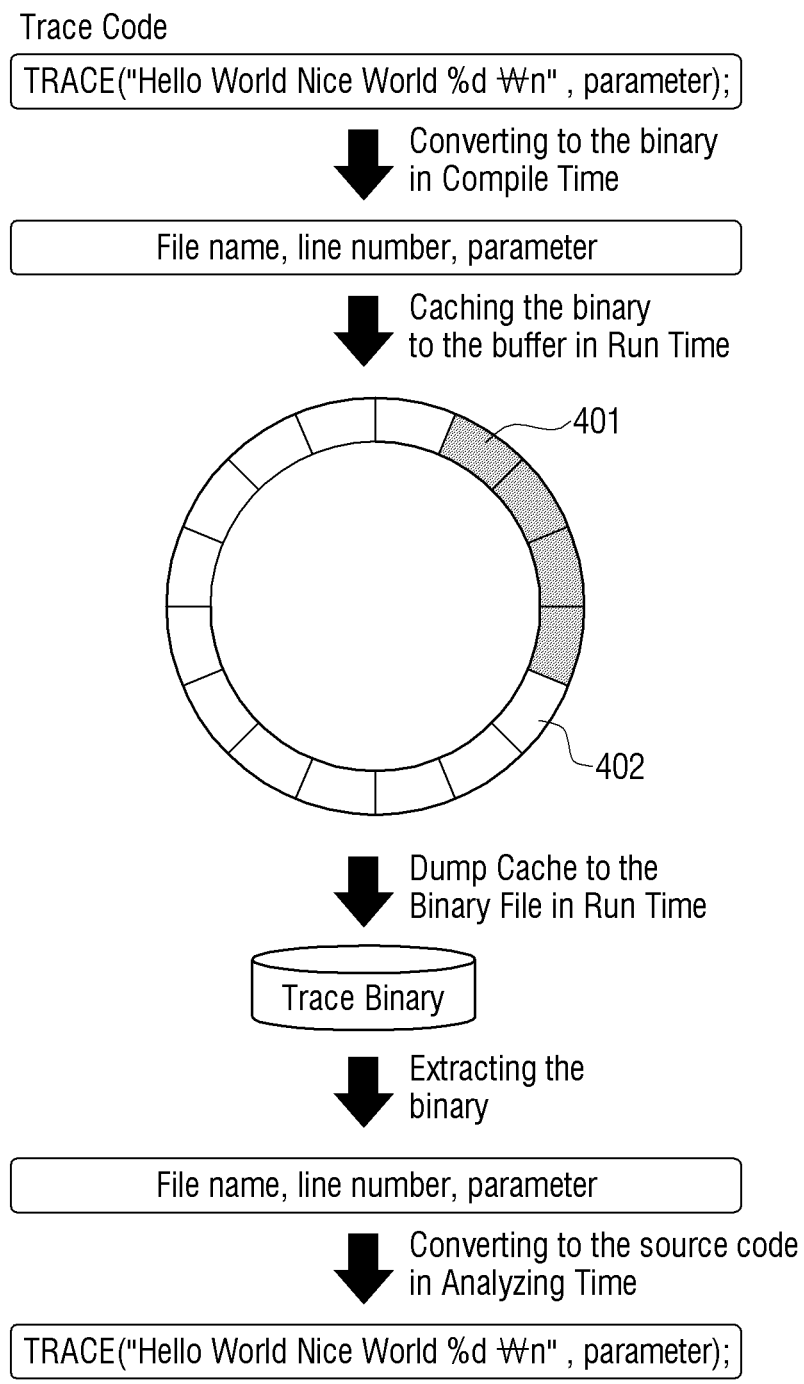
FIG. 4 is a diagram illustrating example operations of an electronic apparatus according to an example embodiment.

The buffer 110 stores debugging information obtained in the electronic apparatus 100. Herein, the buffer 110 may be a circular buffer as illustrated in FIG. 4. The buffer 110 stores debugging information, and in response to debugging information being requested by the processor 120, the buffer 110 transmits the debugging information to the processor 120. Herein, the processor which received the debugging information may be the processor 120 inside the electronic apparatus 100, but the processor 120 may be a processor of an external apparatus which can perform debugging.

The processor 120 may include various processing circuitry and converts a source code of a part where an error occurred to debugging information and store the debugging information in the buffer 110. Existing processors store debugging information in the buffer 110 in a log message form which can be output. Herein, according to a used programming language, functions such as, for example, and without limitation, printf, cout, and the like may be used.

Generally, if an error occurs in the electronic apparatus 100, the same log message is continuously obtained. In existing methods, a log message which can be stored by a product is limited because a log message by the same debugging information is stored as it is in the buffer 110.

The processor 120 according to an example embodiment does not store a log message regarding continuously occurring error as it is, and if the debugging information is the same, by adding index information to the occurred debugging information, only index information for outputting a log message is stored in the buffer 110. If there is a request from a user, the processor 120 outputs a log message using debugging information including index information. Through this method, a capacity problem of the buffer 110 may be resolved and/or improved.

The process of outputting the log message is described in greater detail below. If there is a request from a user, the processor 120 obtains and obtains debugging information which was collected and maintained in a binary file form from the buffer 110. Herein, the binary file may include, for example, and without limitation, a binary header which includes a file name, a line number and parameter information of debugging information and an execution binary which includes index information of the debugging information.

The processor 120 recovers the obtained binary file as an original debugging signal. Herein, the processor 120 may recover the debugging information by using information of the binary header and the execution binary, and output the debugging information as a log message.

This is merely an example embodiment, and the processor 120 may omit a process of recovering a debugging signal. In this case, the processor 120 may transmit the obtained binary file to an external apparatus and the external apparatus may output a log message by recovering the debugging information.

Figure 2:
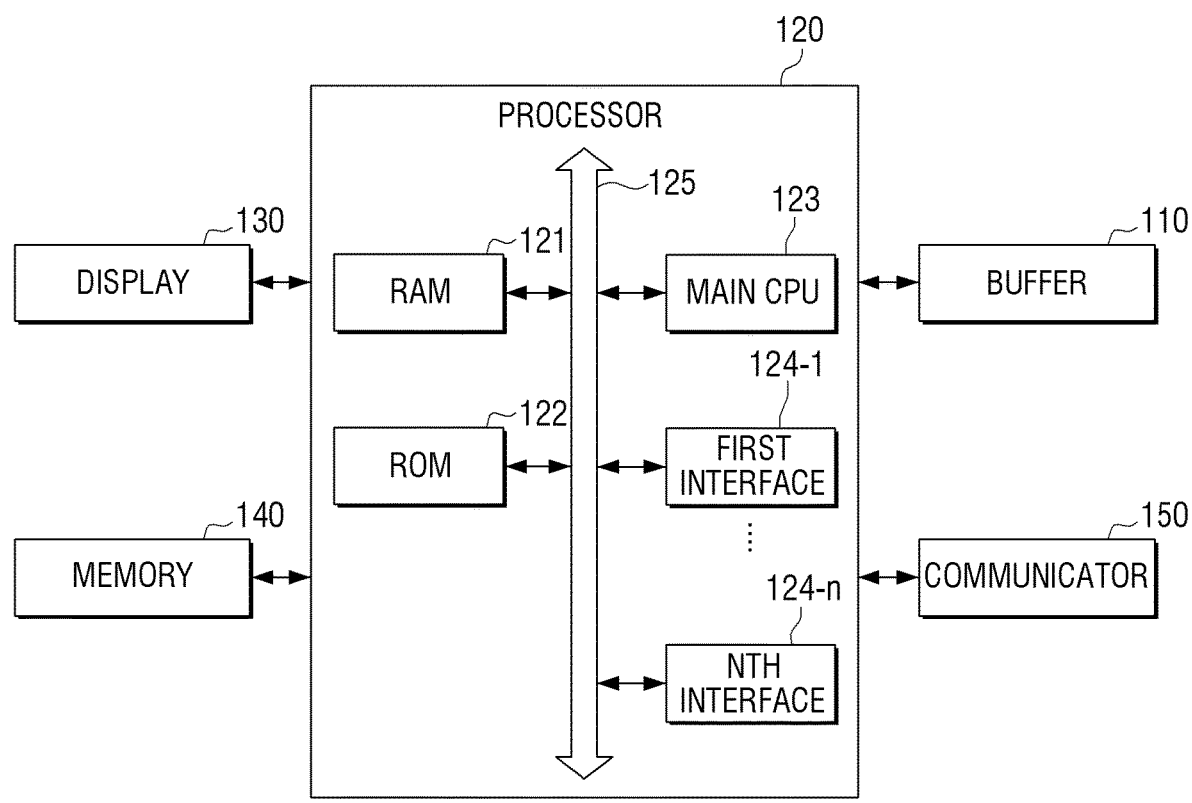
FIG. 2 is a block diagram illustrating an example electronic apparatus according to an example embodiment.

FIG. 2 is a block diagram illustrating an example electronic apparatus according to an example embodiment.

As illustrated in FIG. 2, the electronic apparatus 100 may further include the buffer 110, the processor (e.g., including processing circuitry) 120, a display 130, a memory 140 and a communicator (e.g., including processing circuitry) 150. For example, and without limitation, the electronic apparatus 100 may be a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), a set-top box, or programmable electronics, or the like, but it is not limited thereto.

The display 130 is a part that displays a function corresponding to a kind of the electronic apparatus 100, and if the electronic apparatus 100 is a digital TV, the display 130 may display contents received from an external source, and if the electronic apparatus 100 is a laptop PC, a program which is being executed may be displayed. However, it is only example embodiment, and is not limited thereto. If the electronic apparatus 100 can output and analyze a log message, an output log message may be displayed.

The memory 140 may include registers to use information such as an execution code and data to operate a program. The memory 140 may dump loaded memory to the processor 120 for debugging. Herein, the memory 140 may be a component of an external debugging apparatus which performs debugging or may be a component of a digital TV as illustrated in FIG. 2.

The communicator 150 may include various communication circuitry and communicate with an external apparatus. Herein, the external apparatus may be a debugging apparatus which receives the binary file obtained from the processor 120 and analyzes debugging information.

Herein, a network which the communicator 150 can use is not limited to a certain method. For example, the network may include a mobile communication network, e.g., CDMA, GSM, HSPA+, LTE, etc., a local area communication network, e.g., Wi-Fi, Bluetooth, Wibro, Wimax, ZigBee, etc., and a wired communication network, e.g., Ethernet, xDSL (ADSL, VDSL), Hybrid Fiber Coaxial Cable (HFC), etc.

The processor 120 may include the RAM 121, the ROM 122, a main central processing unit (CPU) 123, first through nth interfaces 124-1 through 124-n, and a bus 125. In this case, the RAM 121, the ROM 122, the main CPU 123, and the first to nth interfaces 124-1 to 124-n may be interconnected through the bus 125.

The RAM 121 stores operating system (O/S) and application programs. Specifically, as the electronic apparatus 100 is booted, O/S may be stored in the RAM 121 and various application data selected by a user may be stored in the RAM 121.

The ROM 122 stores a set of commands for system booting. When a turn-on command is input and thus the power is supplied, the main CPU 123 may copy the O/S stored in the memory 140 to the RAM 121 according to the commands stored in the ROM 122, and boot the system by executing the O/S. When the booting is completed, the main CPU 123 may copy various application programs stored in the memory 140 to the RAM 121, and perform various operations by executing the application programs copied to the RAM 121.

The main CPU 123 may access the memory 140 and perform booting by using the O/S stored in the memory 140. Further, the main CPU 123 may perform various operations by using various programs, contents, data, and so on stored in the memory 140.

The first to nth interfaces 124-1 to 124-n are connected to the aforementioned various components. One of the first to nth interfaces 124-1 to 124-n may be a network interface connected to an external apparatus through a network.

Hereinafter, the electronic apparatus is described in greater detail below with reference to FIGS. 3 to 8.

Figure 3:
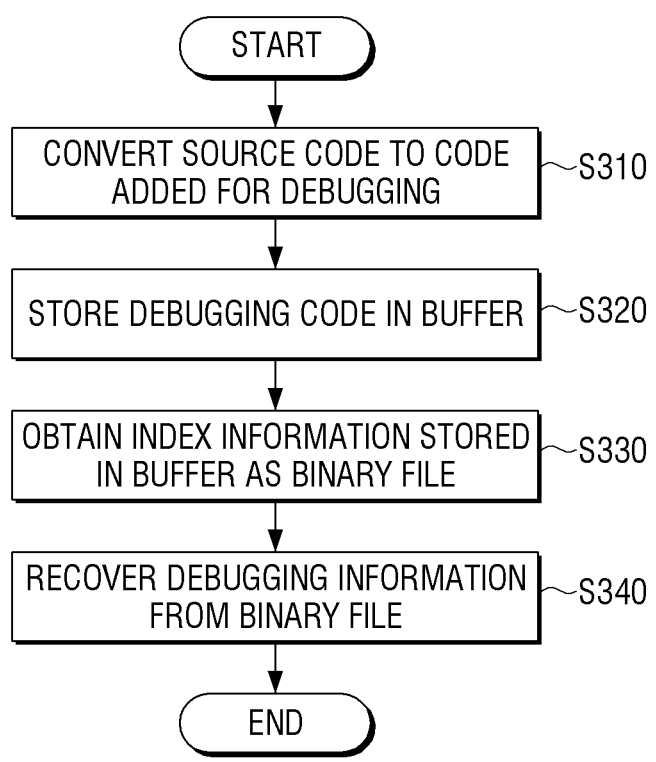
FIG. 3 is a flowchart illustrating example operations of an electronic apparatus according to an example embodiment.

FIG. 3 is a flowchart illustrating example operations of an electronic apparatus according to an example embodiment.

A source code is converted to an added code for debugging (S310). Herein, in the code added for debugging may include a file name, a line number, parameter and index information. The file name indicates a name of a file where a log message to be output is located, and the line number is an element that indicates which line of the file the log message to be output is located on. The parameter is a variable not to use information of string always having the same information but to use a variable value as debugging information. The index information is an element to identify whether a plurality of log messages are the same or different. For example, if output log messages are the same, the index information is the same.

A debugging code is stored in the buffer 110 (S320). Herein, the debugging information and the index information are stored in the buffer 110. If the debugging information which is stored in the buffer 110 is the same to a pre-stored debugging information, only the index information is stored in the buffer 110, and if the debugging information stored in the buffer 110 is different from a pre-stored debugging information, a debugging code including the index information is stored in the buffer 110.

If there is a request from a user, or a pre-set condition is satisfied, the processor 120 obtains the stored index information as a binary file (S330). The binary file consists of a binary header and an execution binary. Explanations regarding thereto are described in greater detail below with respect to FIG. 5.

In the electronic apparatus 100 or in the external apparatus for debugging, the debugging information is recovered from the received binary file (S340). Operation S340 may also be carried out inside the digital TV.

FIG. 4 is a diagram illustrating example operation of an electronic apparatus according to an example embodiment. For example, it is illustrated that a process of Trace ("Hello World Nice World % d", parameter); being converted to debugging information including index information and stored in the buffer 110, and being recovered to Trace ("Hello World Nice World % d", parameter).

When Trace ("Hello World Nice World % d", parameter); is input, it can be converted to at least one of a file name, a line number and parameter of a binary value. As described above, the parameter is a variable not always using information of a string having the same information but using a variable value as debugging information. For example, if function hlog("stringstring=% d", num); is input, variable value num is variably output in % d. The parameter is a variable for outputting such a variable value.

The converted information is stored in buffer 110. In this case, the buffer 110 may be a circular buffer. The circular buffer may have a First in-First out (FIFO) structure. In other words, the circular buffer may maintain the debugging information from a certain past time period.

If the circular buffer is full with information, the circular buffer stores new information by deleting from information input for the first time. Such a circular buffer may include a head 401 and a tail 402. Information is stored in the head 401 and if there is a request from a user, the information is extracted from the tail 401.

If the circular buffer is used, only debugging information of a certain period of time is stored like a black box in a car. Therefore, the circular buffer 110 may avoid a problem of degrading performances of a system because of high capacity of the buffer 110.

If a user request or a pre-set condition is satisfied, the debugging information stored in the circular buffer is converted to a binary file.

The user may recover the original debugging information using necessary information between the binary file and a used certain version's source code.

For example, if string information is included in index information, a log message may be recovered only with a binary file, and if the string information is not included, a log message may be recovered by using a binary file and a source code together.

Figure 5:
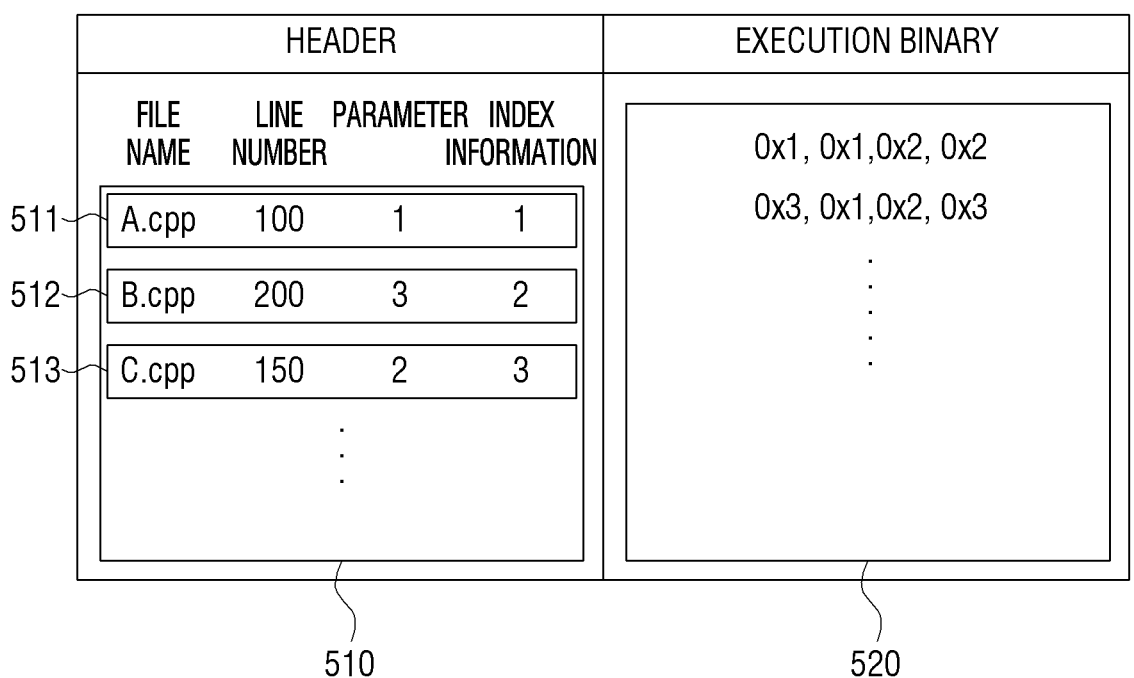
FIG. 5 is a diagram illustrating an example structure of a binary file according to an example embodiment.

FIG. 5 is a diagram illustrating an example structure of a binary file according to an example embodiment.

The binary file includes a binary header 510 and an execution binary 520. As illustrated in FIG. 5, the binary header 510 stores a file name, a line number, parameter and index information. The execution binary 520 stores index information corresponding to input debugging information.

When such a binary file is analyzed, it is possible to recover a log message. Referring to FIG. 5, 0x1, 0x1, 0x2, 0x2, 0x3, 0x1, 0x2, 0x3 is stored in the execution binary 520.

In other words, 8 source codes are converted and input to a buffer. The process is described in greater detail hereinafter.

First, input information is a string on $100^{th}$ line of file A.cpp, and the information is converted to debugging information. Herein, [A.cpp, 100, 1, 1] 511 is stored in the binary header 510, and 0x1 which is an allocated value with respect to the index information is stored in the execution binary.

Second, input information is same to the first input information. In this case, the information which is the string on $100^{th}$ line of file A.cpp is already stored in the header 510, and thus, no information is stored in the binary header 510, and 0x1 is recorded in the execution binary 520.

Third, input information is a string on $200^{th}$ line of file B.cpp, and the information is converted to debugging information. Herein, [B.cpp, 200, 3, 2] 512 is stored in the binary header 510, and 0x2 which is an allocated value with respect to the index information is stored in the execution binary.

Fourth, input information is same to the thirdly input information. In this case, the information which is the string on $200^{th}$ line of file B.cpp is already stored in the binary header 510, and thus, no information is stored in the binary header 510 and 0x2 is recorded in the execution binary 520.

Fifth, input information is a string on $1500^{th}$ line of file C.cpp, and the information is converted to debugging information. Herein, [C.cpp, 150, 2, 3] 513 is stored in the binary header 510, and 0x3 which is an allocated value with respect to the index information is stored in the execution binary.

In the same manner, the information which is already stored in the binary header 510 is input for the sixth, seventh and eighth times, and thus, no information is stored in the binary header 510, and 0x1, 0x2, 0x3 are respectively stored in the execution binary 520.

As a result, instead of storing a repetitive log message, only a location and index information of the log message are stored in the binary file.

According to the above method, the buffer 110 may be efficiently managed and much more information may be stored.

FIG. 6 is a flowchart illustrating an example of storing a binary value in a buffer when an h log function is performed according to an example embodiment.

The h log function is a function arbitrarily named in the disclosure, and may include functions having the same or an equal range of functions of various names, and is not limited to the name h log function itself.

If the h log function is executed (performed) in the processor 120 (S610), the processor 120 identifies whether the input information is the same information to pre-stored debugging information (S620). In other words, the processor 120 identifies whether there is index information regarding the input information.

If there is pre-stored debugging information, index information is not newly obtained, and pre-stored index information is recorded in the execution binary (S660). As illustrated in FIG. 5, if the string on $100^{th}$ line of the file A.cpp repetitively enters, 0x1 is stored in the execution binary.

If there is no pre-stored debugging information, the processor 120 generates a file name, a line number, parameter and index information.

As described with reference to FIG. 5, the file name, the line number, parameter and the index information regarding the debugging information are recorded in the binary header (S640). For example, [A.cpp, 100, 1, 1], [B.cpp, 200, 3, 2] and [C.cpp, 150, 2, 3] are recorded in the binary header.

A new value is allocated to the index information (S650) and the allocated value is recorded in the execution binary (S660).

In this case, information regarding the string may be additionally added to the debugging information.

Figure 7A:
FIGS. 7A and 7B are diagrams illustrating example sizes of information stored in a buffer for comparison.
Figure 7B:

FIGS. 7A and 7B are diagrams illustrating example sizes of information stored in a buffer for comparison.

FIG. 7A illustrates a program code for a method of outputting an existing log message. For example, if a log message to be output is the string "ABCDEFGHIJKLM-NOPQRS" on 100th line and value 10000 in file A.cpp and such a log message continuously enters 100 times, the processor 120 outputs a result by performing
int value=10000;
printf("ABCDEFGHIJKLMNOPQRS % d", value);
100 times. Herein, a value of int form regarding the value, i.e. 10000 is output in % d part of an upper code. Therefore, the processor 120 stores 100 strings of "ABCDEFGHI-JKLMNOPQRS 10000" in the buffer 110, and if a user's request or a pre-set condition is satisfied, content stored in the buffer 110 is output. In this case, a size of a single log message is comprised of "ABCDEFGHIJKLMNOPQRS" and value 10000, and because the size of the string is 20 byte and the size of the value is 5 byte, the total size is 25 byte. In FIG. 7A, the log message should be output 100 times, and thus, the total log message size is 2500 byte.

However, FIG. 7B illustrates a program code regarding the h log function. In FIG. 7B, the h log function is used instead of printf function. As illustrated in FIG. 7A, if a string is "ABCDEFGHIJKLMNOPQRS" and a value is 10000 at 100th line in file A.cpp, and if such a log message continuously enters 100 times, the processor 120 performs
int value=10000;
hlog("ABCDEFGHIJKLMNOPQRS % d", value);
100 times. Herein, the h log function has index information, a file name and a line number as the result values and variables. Unlike illustrated in FIG. 7A, if the same code is repeated 100 times, the h log function adds the index information with respect to the same log message. Specifically, if the string "ABCDEFGHIJKLMNOPQRS" and value "1000" on 100th line of file A.cpp continuously enter, the hlog function adds index information "1" with respect to the string "ABCDEFGHIJKLMNOPQRS" and value "1000" on 100th line of file A.cpp and outputs index information "1" with respect to the same information.

Therefore, when the information stored in the buffer 110 is output, as illustrated in the below part of FIG. 7B,
1A.cpp100(index, file name, line number)
11111111111111111111111111111 . . . .
is output. The first line of the output information indicates binary index information. Specifically, from "1A.cpp 100," 1 is index information, 100 indicates how many times the code is repeated, and a part in the parenthesis indicates which line's information of the file should be output. The repeated 1 is recorded according to how many times the code is repeated and in the case illustrated in FIG. 7B, 1 will be output 100 times.

In this case, because the size stored in the buffer 110 is binary index ID information 13 byte (id 4 byte+filename 5 byte+line number 4 byte)+((index size (4 byte)+value size(4 byte))*100) and thus, the size is 813 byte. In other words, when FIG. 7B is compared to FIG. 7A, the same information may be output with ⅓ the memory size.

Afterward, the debugging device or the processor 120 may obtain the result of the h log function as a binary file and recover the same log message shown in FIG. 7A.

If the log message is recovered according to the example embodiment in the disclosure, the debugging information which is stored in the buffer 110 by the h log function and an original source code are necessary. In other words, a string on the location in the source code should be output from the debugging information.

However, according to another example embodiment of the disclosure, if string information when an initial index is stored once, recovering a log message without a course code is possible. Specifically, when the h log function is executed, if the string information is stored together in the buffer 110, it is possible to recover a log message without a source code. In this case, the string is added once, the size stored in the buffer 110 will be 833 byte (813 byte+20 byte=833 byte).

When it is considered that the same log message is continuously obtained when an error is occurred in an electronic apparatus, there is an effect of reducing a size of information stored in the buffer 110 when compared with an existing debugging method.

Figure 8:
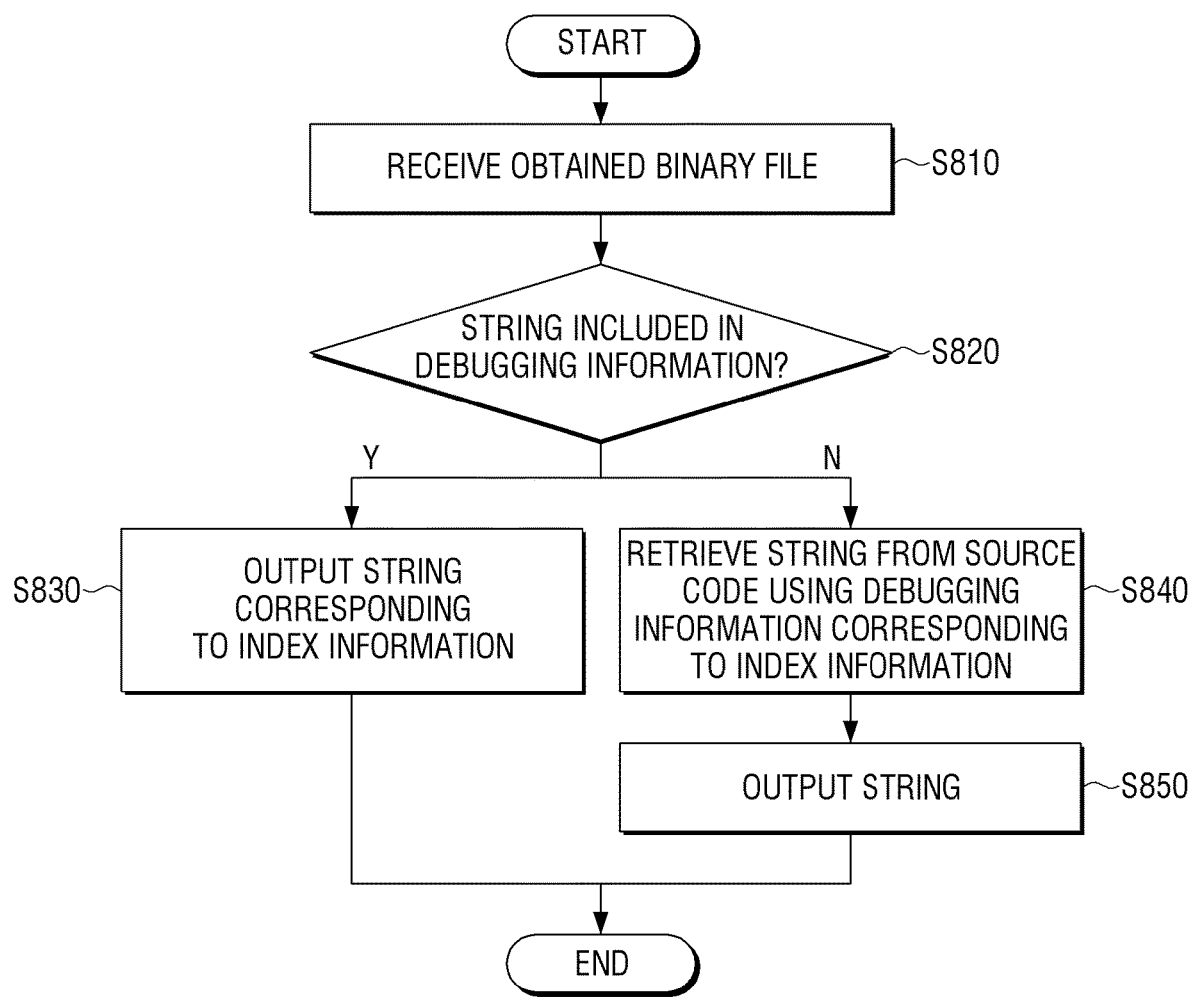
FIG. 8 is a flowchart illustrating an example process of recovering original debugging information using a binary file according to an example embodiment.

FIG. 8 is a flowchart illustrating an example process of recovering original debugging information by using a binary file according to an example embodiment. For example, FIG. 8 is a flowchart regarding a method for recovering debugging information when string information is stored in a buffer and when the string information is not stored in the process of recovering the debugging information.

Recovering the debugging information may be executed in the processor 120 of the electronic apparatus 100, but is not so limited, as the recovering may be executed by an external apparatus. It is described that the processor 120 of the electronic apparatus 100 recovers debugging information but it is not limited thereto.

The processor 120 receives an obtained binary file (S810). Herein, the processor 120 may be configured to include string information to debugging information or configured not to include string information.

If the string information is included in the debugging information (S820), a string corresponding to index information is output (S830).

Meanwhile, if the string information is not included in the debugging information, a string is searched from a source code using the debugging information corresponding to the index information (S840).

The processor 120 finds a string of the source code and outputs the string (S850).

Example embodiments are referred to and described but many alternatives, modifications, and variations within the scope of the following claims will be apparent to those skilled in the art.

What is claimed is:

1. A control method of an electronic apparatus which records debugging information, the method comprising:
   obtaining debugging information using a source code;
   adding index information, which corresponds to the debugging information, to the debugging information and storing the debugging information which includes the index information in a buffer; and
   converting a plurality of pieces of index information stored in the buffer to a binary file.

2. The method as claimed in claim 1, wherein the debugging information includes at least one of: file information, line information and parameter information.

3. The method as claimed in claim 2, wherein the debugging information further includes string information.

4. The method as claimed in claim 3, wherein the index information is identified using at least one of: the file information, the line information and the parameter information.

5. The method as claimed in claim 1, wherein the buffer comprises a circular buffer.

6. The method as claimed in claim 3, further comprising:
recovering the debugging information using at least one of the binary file and the source code in response to there being a request for error checking.

7. The method as claimed in claim 1, wherein the storing further comprises:
identifying whether the debugging information is pre-stored debugging information; and
if the debugging information is not pre-stored debugging information, adding index information, which corresponds to the debugging information, to the debugging information and storing the debugging information which includes the index information in the buffer.

8. The method as claimed in claim 7, wherein, in response to the debugging information being the same as the pre-stored debugging information, the index information of the pre-stored debugging information is stored in the buffer.

9. An electronic apparatus which records debugging information, the apparatus comprising:
a buffer configured to store debugging information; and
a processor configured to obtain the debugging information using a source code, to add index information, which corresponds to the debugging information, to the debugging information, and to convert a plurality of pieces of index information stored in the buffer to a binary file.

10. The apparatus as claimed in claim 9, wherein the debugging information includes at least one of: file information, line information and parameter information.

11. The apparatus as claimed in claim 10, wherein the debugging information further includes string information.

12. The apparatus as claimed in claim 11, wherein the processor is configured to identify index information using at least one of: the file information, the line information and the parameter information.

13. The apparatus as claimed in claim 9, wherein the buffer comprises a circular buffer.

14. The apparatus as claimed in claim 9, wherein the processor, in response to there being a user request for error checking, is configured to recover the debugging information using at least one of: the binary file and the source code.

15. The apparatus as claimed in claim 9, wherein the processor is configured to identify whether the debugging information is pre-stored debugging information, and if the debugging information is not pre-stored debugging information, to add index information corresponding to the debugging information to the debugging information and to store the debugging information in the buffer.

16. The apparatus as claimed in claim 15, wherein, in response to the debugging information being the same as the pre-stored debugging information, the processor is configured to store the index information of the pre-stored debugging information in the buffer.

17. A non-transitory computer readable recording medium having recorded thereon a program which when executed by a processor, causes the processor to perform a control method of an electronic apparatus which records debugging information, wherein the control method comprises:
obtaining debugging information using a source code;
adding index information, which corresponds to the debugging information, to the debugging information and storing the debugging information in a buffer; and
converting a plurality of pieces of index information stored in the buffer to a binary file.

\* \* \* \* \*